United States Patent [19]

Hammett et al.

[11] Patent Number: 5,794,864
[45] Date of Patent: Aug. 18, 1998

[54] PORTABLE LAWN AND GARDEN MULCHING VACUUM

[75] Inventors: John D. Hammett; Richard W. Trevino, both of Shreveport, La.

[73] Assignee: WCI Outdoor Products, Inc., Cleveland, Ohio

[21] Appl. No.: 728,770

[22] Filed: Oct. 10, 1996

Related U.S. Application Data

[63] Continuation of Ser. No. 508,737, Jul. 28, 1995, abandoned.

[51] Int. Cl.$^6$ .................................................. B02C 13/28
[52] U.S. Cl. ........................... 241/56; 241/169.1; 241/194
[58] Field of Search ............................. 241/92, 56, 169.1, 241/194, 55

[56] References Cited

U.S. PATENT DOCUMENTS

| | | |
|---|---|---|
| 1,413,611 | 4/1922 | Plaisted ................................. 241/194 |
| 2,105,803 | 1/1938 | Barnes . |
| 3,035,621 | 5/1962 | Burcham . |
| 3,400,527 | 9/1968 | Woodring ............................... 241/194 |
| 3,598,326 | 8/1971 | Pennell et al. . |
| 3,608,838 | 9/1971 | Lundin . |
| 3,712,353 | 1/1973 | Ferry . |
| 3,716,089 | 2/1973 | Bateman . |
| 3,716,198 | 2/1973 | Lautzenheiser . |
| 3,790,986 | 2/1974 | Burger . |
| 3,860,181 | 1/1975 | Enters et al. . |
| 3,875,462 | 4/1975 | Kiefer et al. . |
| 3,929,236 | 12/1975 | Koturov . |
| 3,968,938 | 7/1976 | Ruhl et al. . |
| 3,986,676 | 10/1976 | Husmann . |
| 4,074,869 | 2/1978 | Johnson . |
| 4,076,460 | 2/1978 | Roof . |
| 4,117,983 | 10/1978 | Browning . |
| 4,121,405 | 10/1978 | Wolf . |
| 4,227,280 | 10/1980 | Comer . |
| 4,325,163 | 4/1982 | Mattson et al. . |
| 4,430,214 | 2/1984 | Baker . |
| 4,463,907 | 8/1984 | Biersack . |
| 4,469,283 | 9/1984 | Noguchi et al. . |
| 4,796,820 | 1/1989 | Hansen ............................. 241/169.1 X |
| 4,870,714 | 10/1989 | Miner . |
| 4,875,630 | 10/1989 | Carlson . |
| 4,951,882 | 8/1990 | Ober . |
| 4,984,747 | 1/1991 | Lechner . |
| 5,033,259 | 7/1991 | Adcock . |
| 5,056,605 | 10/1991 | Bond et al. . |
| 5,085,375 | 2/1992 | Haworth . |
| 5,102,056 | 4/1992 | Ober ........................................ 241/92 X |
| 5,123,235 | 6/1992 | Fassauer . |
| 5,156,345 | 10/1992 | Baker . |
| 5,224,326 | 7/1993 | Dunn . |
| 5,240,189 | 8/1993 | Majkrzak et al. ................... 241/92 X |
| 5,245,726 | 9/1993 | Rote et al. . |
| 5,279,467 | 1/1994 | Lydy ....................................... 241/92 X |
| 5,358,189 | 10/1994 | Vandermolen ........................ 241/92 |
| 5,588,178 | 12/1996 | Liu . |

FOREIGN PATENT DOCUMENTS

| | | |
|---|---|---|
| 32 19182 | 11/1983 | Germany . |
| 2062497 | 5/1981 | United Kingdom ................ 241/194 |

*Primary Examiner*—Mark Rosenbaum
*Attorney, Agent, or Firm*—Marc A. Hubbard; Munsch Hardt Kopf Harr & Dinan, P.C.

[57] ABSTRACT

The invention provides for a portable apparatus for shredding yard and garden waste. Particularly shaped blades are used for better shredding and mulching performance.

11 Claims, 4 Drawing Sheets

5,794,864

PORTABLE LAWN AND GARDEN MULCHING VACUUM

This Application is a continuation of application Ser. No. 08/508,737 filed Jul. 28, 1995, now abandoned.

TECHNICAL FIELD OF THE INVENTION

The present invention relates to lawn and garden devices for shredding waste and, in particular, to a portable lawn and garden mulching vacuum.

BACKGROUND OF THE INVENTION

Vacuum-assisted apparatus for shredding leaves and other yard debris are well known in the prior art. These apparatus include a rotating cutting means and a fan or impeller. Rotating the impeller sucks the debris into a housing, toward and through the cutting means and then blows shredded debris through an outlet opening in the housing where it can be collected.

U.S. Pat. No. 4,325,163 of Mattson, et al. discloses such an apparatus in the form of hand-held, portable leaf blower/vacuum unit. It is lightweight, compact and easily maneuverable. The unit includes a motor-driven centrifugal impeller for sucking yard debris into a housing, cutting it with a cutting means mounted for rotation with the centrifugal impeller and blowing it out of the housing and into a bag. The cutting means, which includes an elongate blade, fixed in a position that is substantially perpendicular to the axis of rotation of the impeller for chopping, chops solid materials drawn into the impeller's housing, such as leaves or the like, prior to contact with the impeller. On the housing are two handles for enabling the unit to be manually lifted from the ground and oriented in any desired position. Attached for rotation with the impeller is a blade.

U.S. Pat. No. 5,245,726 of Rote et al. discloses an apparatus which includes a fan housing defining an intake opening. To the intake opening is attached a tube. Yard waste is drawn through the tube and intake opening and then expelled out through an outlet opening in the fan housing. An impeller is rotated within the fan housing for intercepting yard waste at the intake opening and expelling it through the outlet opening. A cutting structure or attachment, which includes at least one elongate blade having a length projecting substantially parallel to the rotation axis of the impeller, reduces the size of the yard waste drawn into the intake opening. The blade tends to tear up the incoming yard waste before it can encounter the impeller, thereby reducing the tendency of large items to become trapped between the impeller and the fan housing. The cutting structure or attachment includes four, elongated blades which project in the direction of the axis of the shaft of a centrifugal impeller. Each blade is supported on a connecting arm which extends angularly away from a mounting base of the cutting structure and connects with the blade so that the entire length of the blades are generally parallel to each other and a rotational axis of the impeller.

Lawn and garden vacuum apparatus such as disclosed by Mattson et al. and Rote et al. shred or mulch leaves and other soft vegetation well. However, larger or more fibrous yard and garden waste, such as pine cones and sweet gum balls, are not easily shredded. These objects tend to become trapped between the impeller or cutting means and the sides of the intake tube and opening, becoming permanently wedged and creating friction between the impeller and the fan housing that causes the impeller to stall or that creates enough friction with the impeller and/or housing that the impeller and/or housing suffer undue wear or melt if made of plastic. Furthermore, these objects tend to obstruct flow of air and other debris through the intake tube and opening of the fan housing, causing the tube and opening to become clogged. In either case, the apparatus must be stopped and the tube cleared, either by hitting the tube to dislodge the debris or removing the tube from the intake opening to manually clear the debris.

SUMMARY OF THE INVENTION

The invention provides for a portable apparatus for shredding yard and garden waste having improved shredding and mulching performance.

According to the invention, a portable apparatus having an impeller mounted in a fan housing includes cutting blades pivotally coupled to the impeller's hub for intercepting yard and garden debris as it enters housing's intake opening. When encountering relatively large or massive debris, the blades will tend to pivot inwardly and in a direction opposite the direction of rotation. The pivoting of the blade reduces the possibility that a large object will wedge between the blade and the impeller, or between the blade and the fan housing. Uncomfortable jolts or vibrations caused by the blades encountering particularly hard debris also tend to be reduced.

According to another aspect of the invention, secondary blades are fixed with respect to the impeller. The blades are inboard of the pivoting blades so that debris will not wedge between the secondary blades and the intake opening of the fan housing. The secondary blades tend to change the speed at which debris within the intake opening rotates, helping to mix it. The mixing helps to prevent debris from clogging the intake opening and bridging the space between the flailing tips of the pivoting blades, and assists in changing the rotational speed of the debris with relation to the pivoting blade speed so that the pivoting blades make good contact with yard debris.

DETAILED DESCRIPTION OF THE DRAWINGS

Figure 1:
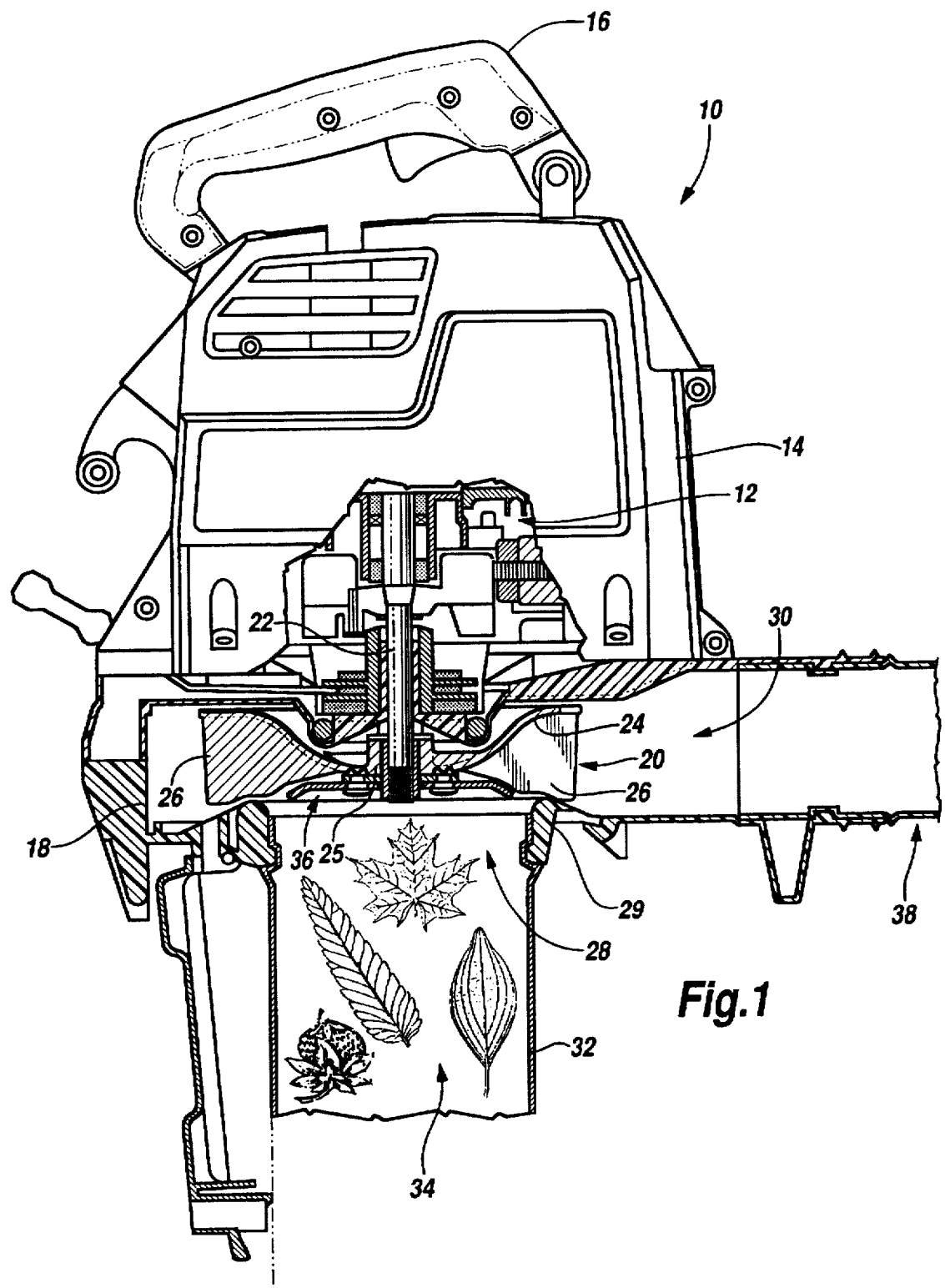
FIG. 1 is a side view of a leaf blower and vacuum apparatus, partially section, having cutting means attached to an impeller for shredding yard and garden debris and waste entrained in air flowing into the apparatus.

Referring to FIG. 1, a portable apparatus for shredding yard waste 10, to be carried by a person in an elevated position, is illustrated in the form a conventional hand-held, convertible leaf blower and vacuum. The apparatus includes a power source, such as an internal combustion engine 12, as shown, or an electric motor. The power source is located within a housing or shroud 14, to which is attached a handle 16 that enables the apparatus to be manually elevated above the ground.

Disposed within fan housing 18 is a fan in the form of centrifugal impeller 20. The impeller includes a back plate 24, a hub 25 for mounting the impeller to the engine's drive shaft 22, and a plurality of vanes 26 disposed around the circumference of the impeller. Rotation of the impeller 20 by the drive shaft causes air to flow into intake opening 28 defined by collar 29 of the fan housing 18, and then radially outwardly through the vanes 26 and into the interior of the fan housing. The fan housing, which is typically in the shape of a volute, collects the radial flowing air into a stream of air that is expelled through exit opening 30 of the fan housing 18. Attached to the collar 29 of the fan housing, around the intake opening 28, is a elongated vacuum tube 32 having an opening (not seen) which can be placed in close proximity to the ground when the apparatus is being held by handle 16. Yard debris 34 is entrained in a flow of air travelling upwardly through the vacuum tube 32 toward impeller 20. When the debris encounters cutting structure 36, it is shredded and then carried by the flow of air through the vanes of the impeller, into the fan housing 18, and then out through the exit opening 30. Exiting debris is collected in a porous bag (not seen) having an opening hung around tube 38.

Figure 3:
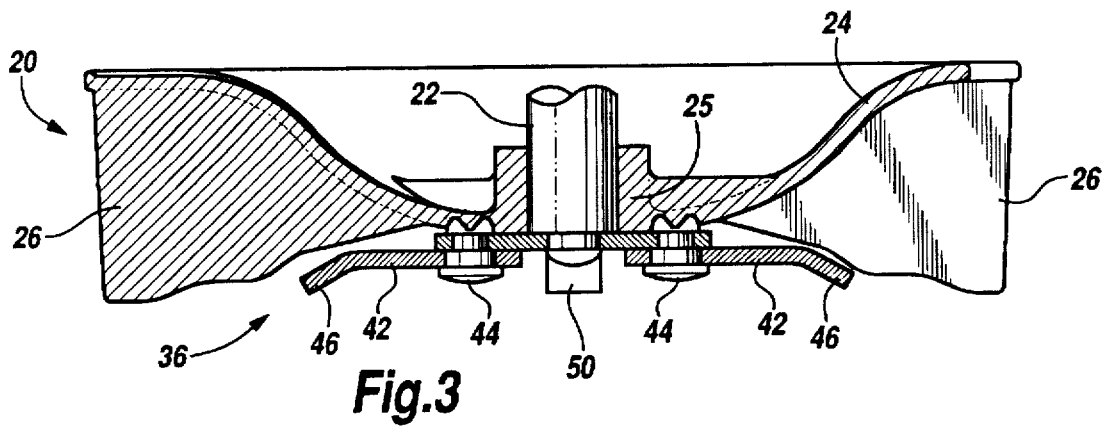
FIG. 3 is a cross section taken along section line 3—3 of FIG. 2.
Figure 4:
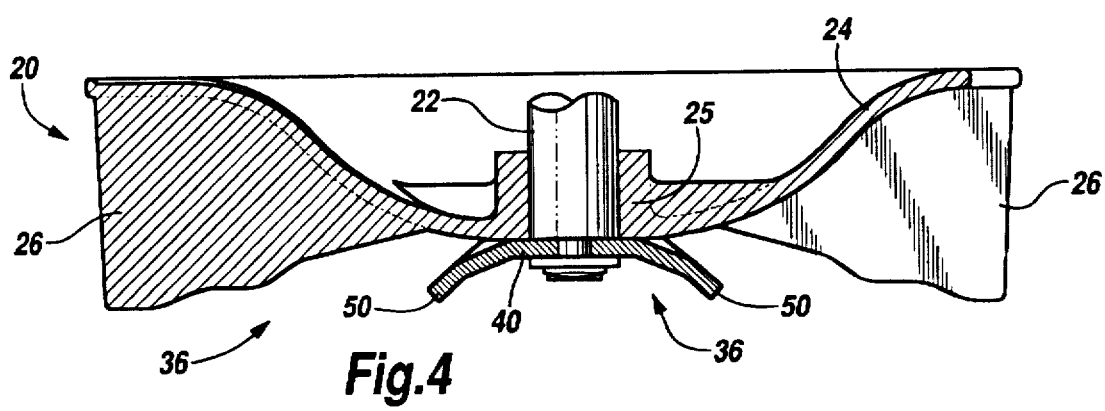
FIG. 4 is a cross section taken along section line 4—4 of FIG. 2.
Figure 2:
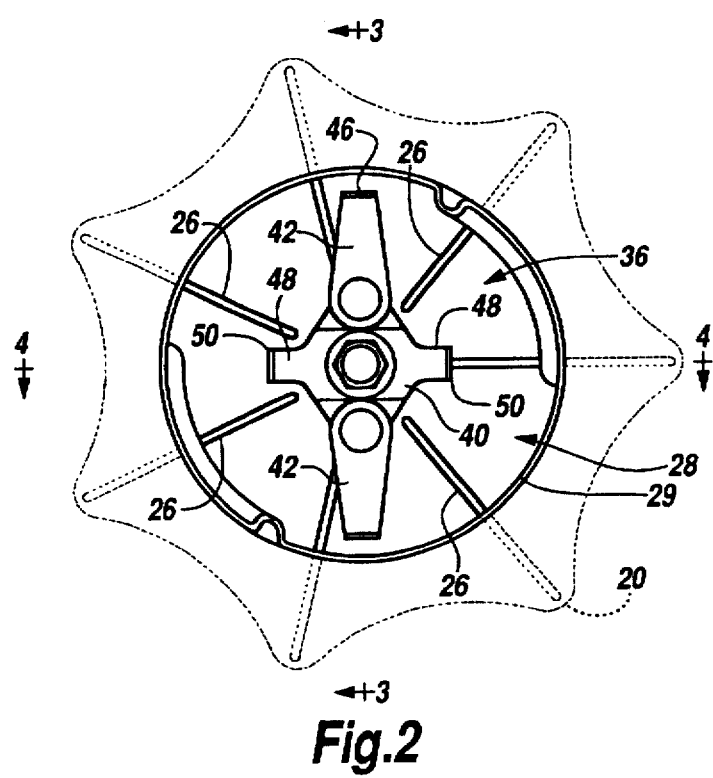
FIG. 2 is a view of an intake opening of the apparatus of FIG. 1 looking from the bottom of the apparatus.

Referring now to FIGS. 2–4, cutting structure 36 is mounted to drive shaft 22 using carrier 40. Alternately, it can be mounted directly to hub 25 of the impeller 20. The cutting structure 36 turns with the impeller 20 and remains substantially fixed with respect to the impeller. Two flailing blades 42 are pivotally mounted to opposite ends of carrier 40 using rivets 44. The flailing blades are permitted to swing freely about the centerline of the rivets, generally within a plane perpendicular to the axis of rotation of the drive shaft 22 and impeller 20. The flailing blades are each substantially perpendicular to the axis of rotation of the drive shaft 22. However, tips 46 of the flailing blades are turned toward the direction of incoming debris and may be sharpened to enhance shredding. Extending from opposite sides of carrier 40, between the ends to which the flailing blades are mounted, are secondary blades 48 having a fixed orientation with respect to the carrier and the impeller. Tips 50 of the secondary blades are also turned toward the intake opening and incoming debris. The tips of the flailing blades are nearer the edge of the intake opening 28, as defined by collar 29, than the secondary blades.

As large debris such as a pine cone encounters the cutting structure 36, it will tend to glance off either the secondary blades 48 or the flailing blades 42, or both. The flow of air entering the intake opening will return the debris. Each glancing impact will tend to break up the debris until it is small enough to pass between the vanes 26 of the impeller. Since the flailing blades 42 pivot, the debris will tend not to wedge between the blades and the side of the fan housing. Furthermore, less force will be transmitted to the drive shaft 22 upon impact of the flailing blades with the large debris. The secondary 48 blades will tend to help mix up debris to preventing clogging and debris bridging between the flailing blades. Mixing of the debris tends to change the speed at which debris spins within the intake opening, thus promoting contact between the flailing blades and the debris which leads to better shredding. Debris tends not to wedge between the secondary blades 48 and the fan housing or tube 32 since the tips 50 of the secondary blades are located well inside the edge of the intake opening 28.

Figure 6:
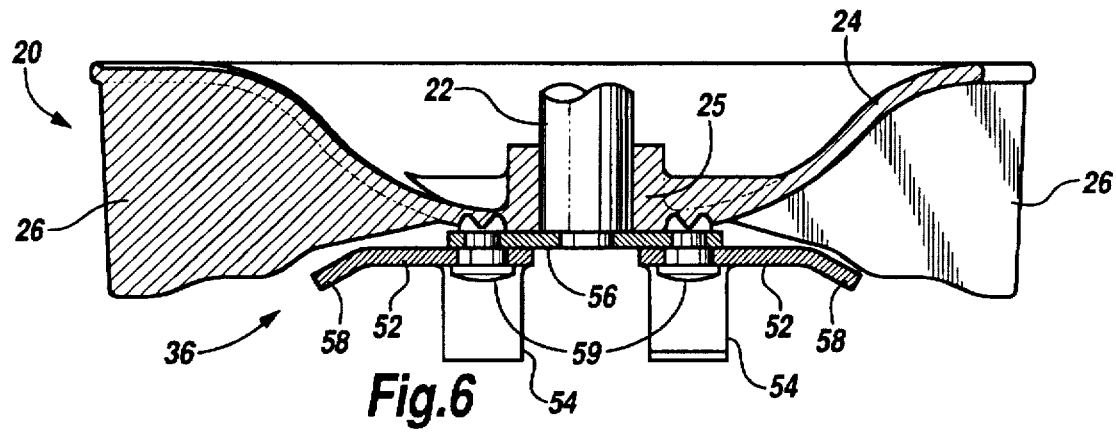
FIG. 6 is a cross section taken along section line 6—6 of FIG. 5.
Figure 7:
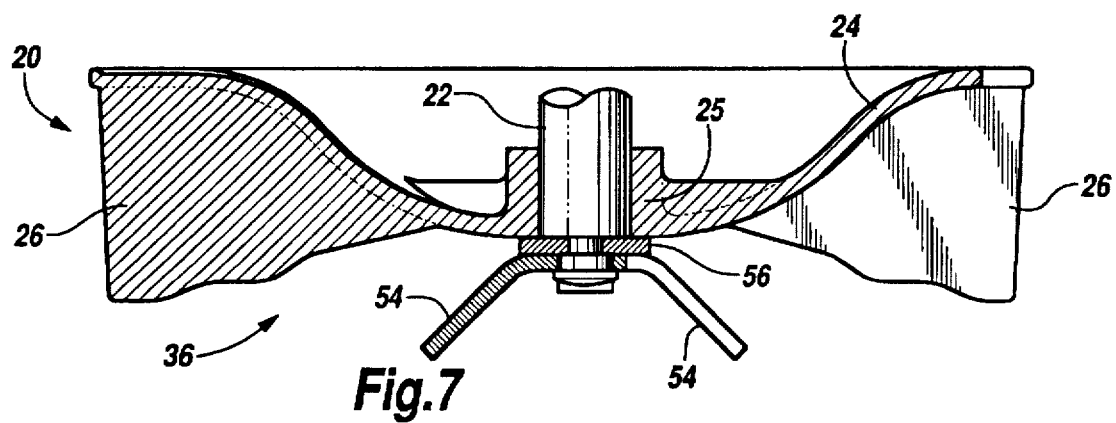
FIG. 7 is a cross section taken along section line 7—7 of FIG. 5.
Figure 5:
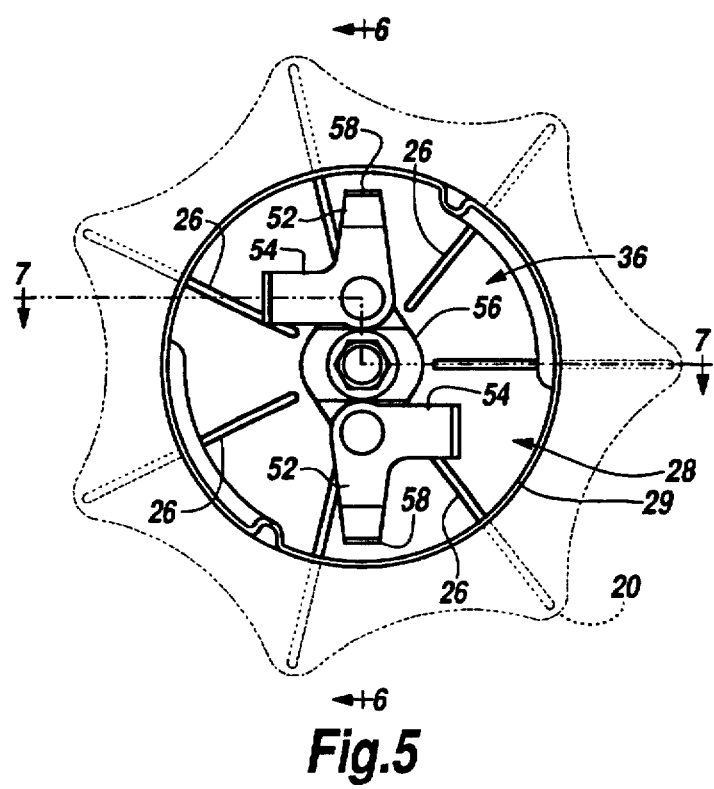
FIG. 5 is a view of an alternate embodiment of a cutting means for shredding yard waste attached to the impeller of the apparatus of FIG. 1.

Referring now to FIGS. 5–7, an alternate configuration for cutting structure 36 has both primary blades 52 and secondary blades 54, oriented at ninety degrees to each other, pivotally mounted to opposite ends of carrier 56 using rivets 59. Carrier 56 is mounted to drive shaft 22 for rotation with the drive shaft and impeller 20. Alternately, the carrier can be mounted directly to impeller 20, or the blades pivotally mounted directly to the impeller. The primary blades 52 are generally perpendicular to the axis of rotation of the drive shaft 22, but have tips 58 turned toward incoming debris. Nearly the entire length of each of the secondary blades 54 extend at an angle to the axis of rotation of the drive shaft, toward incoming debris for good mixing.

Figure 8:
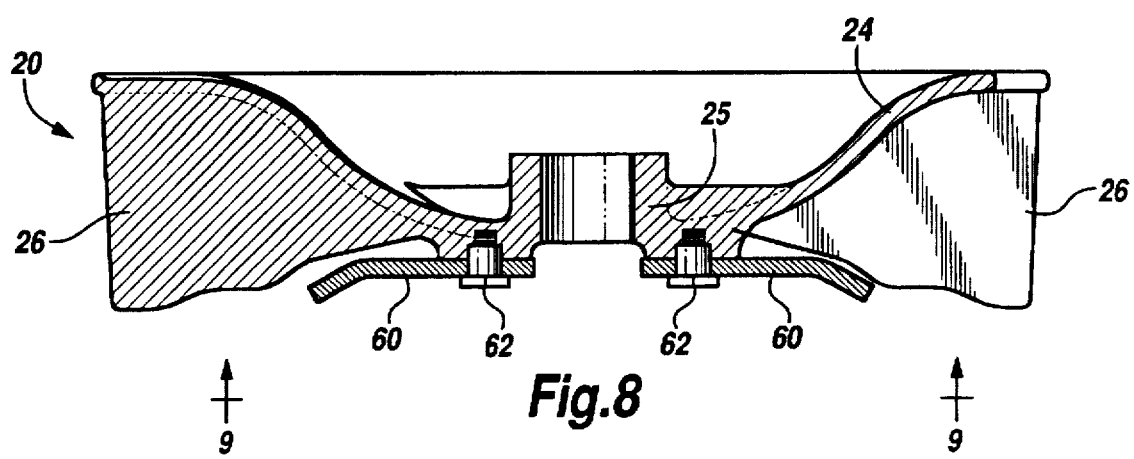
FIG. 8 is a cross section of another alternate embodiment of a cutting means for shredding yard waste attached to the impeller of the apparatus of FIG. 1.
Figure 9:
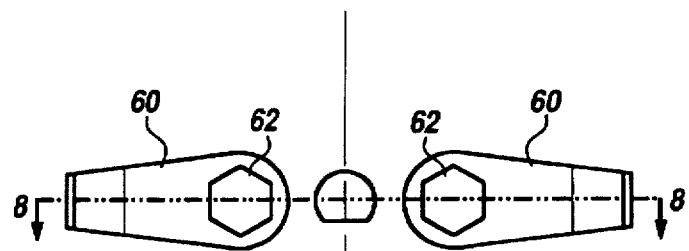
FIG. 9 is a top elevational view of the cutting means of FIG. 8 taken from elevation line 9—9 of FIG. 8.

Referring to FIGS. 8 and 9, the flailing blades 60 are shown pivotally mounted directly to hub 25 of impeller 20 using screws 62.

The forgoing description is of a preferred embodiment only, intended to illustrate the invention. The invention should not be construed as being limited thereto, but, on the contrary, as encompassing such modifications thereof as should fall within the scope of the appended claims.

What is claimed is:

1. Portable apparatus for shredding yard waste comprising:
   a source of rotary power;
   a fan housing carrying any impeller coupled to the source of rotary power, rotation of the impeller causing air to flow into the fan housing through an intake opening defined through the fan housing and out of the fan housing through an exit opening;
   a handle for carrying the fan housing and source of rotary power in an elevated position above the ground;
   means for shredding yard waste connected to the impeller, the means for shredding yard waste including a flailing blade pivotally coupled for rotation with the impeller, a second flailing blade pivotally coupled to the impeller, and a fixed blade coupled with the impeller and in fixed orientation between the first and second flailing blades.

2. The apparatus of claim 1 wherein at least one of the flailing blades pivots about an axis generally parallel to an axis of rotation of the impeller.

3. The apparatus of claim 1 wherein the first and second flailing blades are longer than the fixed blade.

4. The apparatus of claim 1 wherein the first flailing blade pivots about an axis generally parallel to an axis of rotation of the impeller and the second flailing blade pivots about an axis generally parallel to the axis of rotation of the impeller.

5. The apparatus of claim 1 wherein at least one of the flailing blades includes a tip portion turned toward the air intake opening.

6. The apparatus of claim 1 wherein, as the impeller rotates, a diameter of a circle circumscribed by a tip of the first flailing blade is greater than a diameter of a circle circumscribed by a tip of the fixed blade.

7. A convertible leaf blower and vacuum apparatus comprising:
   a fan housing having an inlet opening and an outlet opening, the housing including a removable cover for overlaying the opening when used in a blower mode and a means for coupling a vacuum tube to the inlet opening when used in a vacuum mode;
   a motor mounted with the fan housing;
   a handle for manually carrying the motor and fan housing;

a centrifugal impeller having a hub and a plurality of vanes disposed about the hub, the impeller coupled with the motor within the fan housing for rotation about an axis aligned with the inlet opening, rotation of the impeller causing air to enter the inlet opening and to flow axially toward the hub, radially outwardly through the vanes into the fan housing and out the outlet opening; and a plurality of flailing blades and a fixed blade coupled to the motor for rotation with the impeller.

8. The convertible leaf blower and vacuum apparatus of claim 7 wherein the fixed blade is shorter than the two of the plurality of flailing blades.

9. The convertible leaf blower and vacuum apparatus of claim 7 wherein at least one of the plurality of the flailing blades comprises a tip portion turned toward the inlet opening and pivoting about an axis generally parallel to the axis of rotation of the impeller.

10. A leaf blower and vacuum for shredding yard waste comprising:

a fan housing having an inlet opening and an outlet opening;

a motor mounted to the fan housing;

a centrifugal impeller having a hub and a plurality of vanes disposed about the hub, the hub of the impeller coupled to the motor within the fan housing for rotation about an axis aligned with the inlet opening, rotation of the impeller causing air to enter the inlet opening and to flow axially toward the hub and then radially outwardly through the vanes into the fan housing; and a flailing blade assembly pivotally coupled to the impeller, the flailing blade assembly pivoting about a second axis that is generally oriented parallel to, but displaced radially outwardly from, the first axis, the flailing blade assembly having a primary blade that extends in a first direction generally perpendicular the pivot axis, the primary blade being joined at a substantially right angle with a secondary blade that extends in a second direction generally perpendicular to the pivot axis.

11. The leaf blower and vacuum of claim 10 wherein the primary blade has an end which is bent toward the air inlet opening.

* * * * *